United States Patent
Murtha

(10) Patent No.: US 6,716,109 B1
(45) Date of Patent: Apr. 6, 2004

(54) PUTTING AID AND METHOD FOR USING SAME

(76) Inventor: James L. Murtha, 4405 Marcourt La., West Des Moines, IA (US) 50265

( * ) Notice: Subject to any disclaimer, the term of this patent is extended or adjusted under 35 U.S.C. 154(b) by 0 days.

(21) Appl. No.: 10/055,137

(22) Filed: Jan. 23, 2002

(51) Int. Cl.⁷ .................. A63B 53/06; A63B 53/16; A63B 69/36; A63B 57/00
(52) U.S. Cl. .................. 473/241; 473/226; 473/251
(58) Field of Search .................. 473/226, 231, 473/238, 241, 242, 257, 240, 244, 266, 404, 407, 219; 33/508

(56) References Cited

U.S. PATENT DOCUMENTS

| | | | |
|---|---|---|---|
| 2,457,613 A | | 12/1948 | Thomas |
| 2,670,209 A | * | 2/1954 | Fay .................. 473/241 |
| 3,182,401 A | * | 5/1965 | Stevens .................. 33/228 |
| 3,908,281 A | | 9/1975 | Fox |
| 3,908,991 A | * | 9/1975 | Schwartz .................. 473/241 |
| 4,211,415 A | * | 7/1980 | Lindo .................. 473/241 |
| D306,335 S | | 2/1990 | Franey |
| 4,934,706 A | | 6/1990 | Marshall |
| 5,160,142 A | * | 11/1992 | Marshall .................. 473/241 |
| 5,178,394 A | * | 1/1993 | Tanampai .................. 473/316 |
| 5,283,732 A | * | 2/1994 | Mauritz .................. 473/407 |
| 5,330,179 A | * | 7/1994 | Hampel .................. 473/404 |
| 5,385,349 A | * | 1/1995 | Marshall .................. 473/409 |
| 5,431,391 A | | 7/1995 | Tracey |
| 5,441,270 A | * | 8/1995 | Williams .................. 473/251 |
| 5,755,623 A | * | 5/1998 | Mizenko .................. 473/241 |
| 5,792,015 A | * | 8/1998 | Hoyt et al. .................. 473/404 |
| 5,839,970 A | * | 11/1998 | Lombardo .................. 473/252 |

* cited by examiner

Primary Examiner—Gregory Vidovich
Assistant Examiner—Alvin A. Hunter, Jr.
(74) Attorney, Agent, or Firm—McKee, Voorhees & Sease, P.L.C.

(57) ABSTRACT

A golf putting aid is used with a putter having a handle, a putter head, and an elongated putter shaft. The level includes an elongated member affixed to the level and an attachment member capable of detachably securing the handle to the shaft of a putter. The method comprises attaching the level to the shaft of the putter and using the level to orient the putter shaft in a vertical plumb bob position. The putting aid may be used either with, or without the putter.

8 Claims, 7 Drawing Sheets

HUMAN EYE

PUTTING AID AND METHOD FOR USING SAME

BACKGROUND OF THE INVENTION

The present invention relates to a putting aid and a method for using same.

In the game of golf, there are three variables with which every golfer must deal during putting. One of these variables is the distance of the ball from the hole. Another is the tendency of the ball to break either to the right or to the left when putted and approaching the hole. The final variable is the uphill/downhill nature of the putt over the distance from the ball to the hole.

Golfers commonly use their putter as a plumb bob for determining the various variables of the putt. This is usually done by grasping the grip of the putter between two fingers and permitting the putter to dangle from that grip. The problem with this method of using the putter as a plumb bob is that the putter often does not dangle at a perfectly vertical orientation due to the non-symmetrical arrangement of the putter head relative to the remainder of the putter. Therefore using the putter as a plumb bob in this fashion does not give an accurate read as to the exact orientation of vertical relative to the putt.

Therefore a primary object of the present invention is the provision of an improved putting aid and method for using same.

A further object of the present invention is the provision of a simple and easy to use putting aid which can be carried on the golfer's person and which can be quickly and easily attached to the golfer's putter shaft.

A further object of the present invention is the provision of a putting aid and method for using same which enables the golfer to determine the distance of the putt, the right or left break of the putt, and the uphill/downhill nature of the putt.

A further object of the present invention is the provision of an improved putting aid and method for using same which enables the golfer to use the putter as a plumb bob to determine the correct orientation of vertical relative to the hole and to the putt.

A further object of the present invention is the provision of a putting aid and method which permit the handheld use of the device free from attachment to the putter.

A further object of the present invention is the provision of a putting aid and method for using same which are efficient in operation, durable in use, and simple in construction.

BRIEF SUMMARY OF THE INVENTION

The foregoing objects may be achieved by a golf putting aid for use with a putter having a handle, a putter head, and an elongated putter shaft having a longitudinal shaft axis interconnecting the putter handle and the putter head. The putting aid includes a level having a longitudinal level axis and a bubble indicator for indicating orientation of the longitudinal level axis with respect to a level orientation. An elongated member is affixed to the level and has a longitudinal member axis extending parallel to the level axis. An attachment member is affixed to at least one of the level and the elongated member and is capable of detachable affixation to the putter shaft with the level axis and the member axis extending perpendicular to the shaft axis.

According to another feature of the invention the elongated member includes a plurality of spaced apart indicia marked thereon along the length of the member axis for use in determining the distance of a putting hole from the elongated member.

According to another feature of the invention the attachment member is a magnet. Other means of the attachment may be used without detracting from the other features of the invention.

According to another feature of the present invention, the invention comprises the combination of the putter with the putting aid attached to the shaft of the putter. However, the device also may be used without being attached to the putter without detracting from the other features of the invention.

The method of the present invention comprises using the above-described putting aid either in combination with the above-described putter or by itself without the putter. When used with a putter, the method comprises taking the putting aid and detachably affixing the attachment member of the putting aid to the putter shaft so that the level axis and the member axis are perpendicular to the shaft axis. Next, the orientation of the putter shaft is adjusted until the bubble indicator on the putting aid indicates that the level axis and the member axis are in a horizontal level orientation. This places the putter shaft in a vertical orientation for use as a plumb bob in lining up the putt of a ball positioned on a green in spaced relation to a golf hole.

According to another feature of the invention the method comprises holding the putter at arms length and lining up the outside margins of the golf hole with spaced apart indicia on the elongated member to determine the distance of the golf hole from the putter.

According to another feature of the present invention the method comprises lining up the putter shaft with the center of the hole and determining from the orientation of the surface of the green adjacent the hole whether or not the putt will break right to left or left to right. Alternatively the putter shaft may be lined up with the center of the ball and the same determination made.

According to a further feature of the present invention the method further includes moving to a position between the ball and the hole and to one side of a line between the ball and the hole, and using the vertical orientation of the putter shaft to determine whether the hole is uphill or down hill from the ball. The putting aid can be placed a distance from the putter's eye that causes one end of the putting aid to intersect the ball and the other end to intersect with the flag. It can alternatively be placed with one end lined up with the hole, or can be placed with the putting aid lined up with some point between the ball and the hole. This can be done with, or without, the putting aid attached to the putter. In either case the putting aid is placed in a level orientation to make the determination. If the ball is lower than the hole, the putter aligns one end of the putting device on the ball and looks at how high the other end is above the hole. If the ball is below the hole, then the putter aligns one end of the putting aid with the hole and determines how high the other end is above the ball. The height can be measured in the number of ball thicknesses in order to obtain a consistent measurement.

When used without the putter the putting aid is hand held and placed in a level position. The line of the putt is determined by comparing the surface of the green to the level orientation of the putting aid. This can be done to determine the left or right break of the putt, and from the side can be done to determine the uphill or downhill break of the putt as the ball approaches the hole.

DETAILED DESCRIPTION OF THE INVENTION

Figure 1:
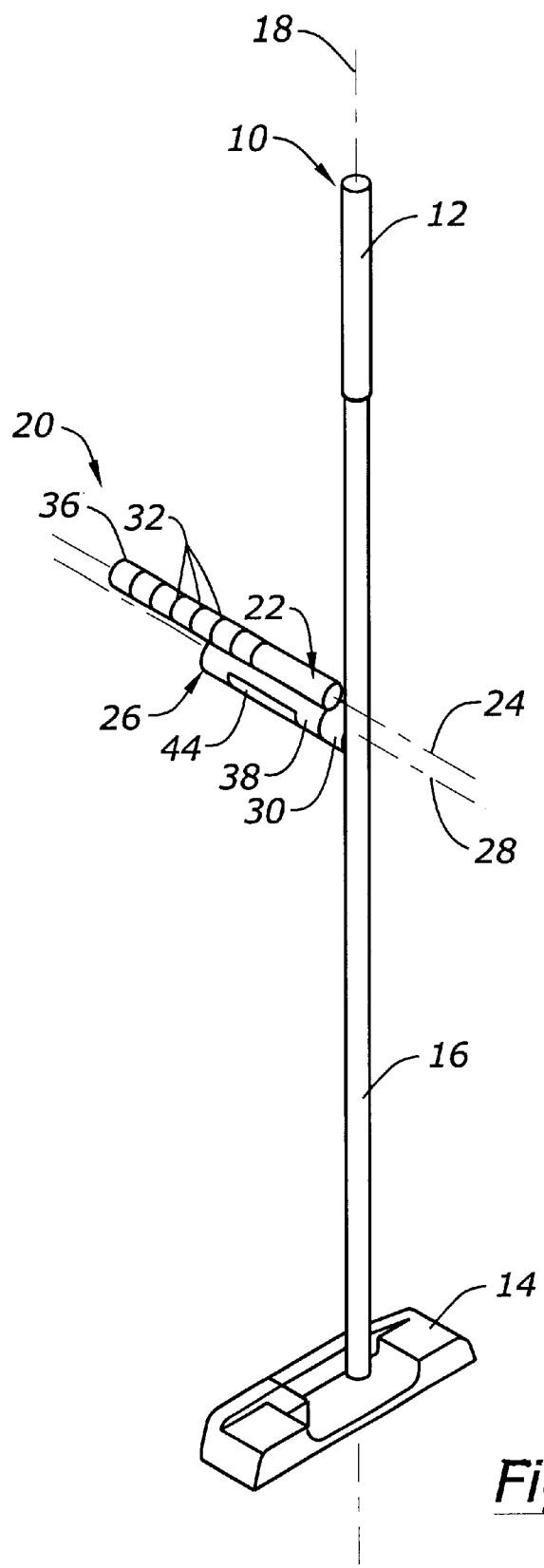
FIG. 1 is a perspective view of a putter having the putter aid attached thereto.

Referring to FIG. 1, a putter 10 is shown having a putter grip 12 and a putter head 14 joined by an elongated putter shaft 16. The numeral 18 designates the longitudinal axis of the putter shaft 16.

Attached to the putter shaft is a putting aid 20 having an elongated member 22. The numeral 24 designates the longitudinal axis of member 22. Member 22 is affixed by glue or other means to a level 26 having a longitudinal level axis 28. The level axis 28 and the member axis 24 are parallel to one another. Connected to the end of the level 26 is an attachment member 30. Attachment member 30 may be of various constructions without detracting from the invention. The preferred means of attachment is the use of a magnet such as the magnet 30 shown in the drawings.

The elongated member 22 includes a plurality of calibrations or indicia spaced apart along its axis 24 and terminates at an inner end 34. Member 22 also has an outer end 36.

Figure 5:
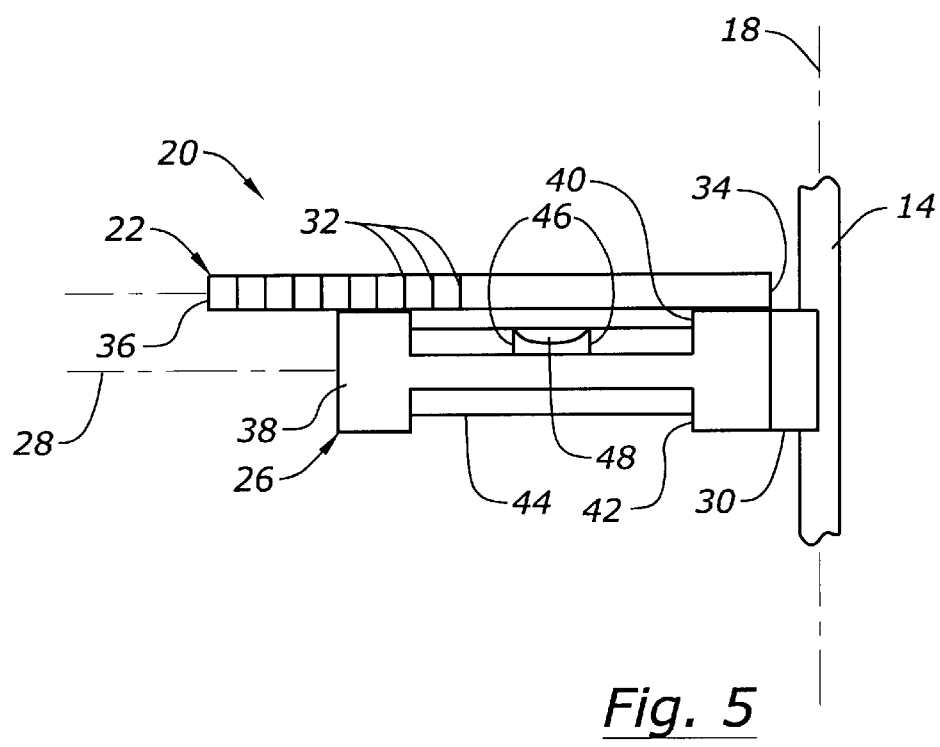
FIG. 5 is an enlarged detail elevational view of the putting aid attached to the shaft of the putter.

Level 26 includes a level frame 38 having an upper viewing window 40 (FIGS. 2, 3, and 5) and a lower viewing window 42. Within the level frame 38 is an elongated glass tube 44 having spaced apart level marks 46 thereon and having a liquid containing a bubble 48. The bubble 48, when it is centered within the level marks 46 indicates that the longitudinal axes 24, 28 are horizontal and level.

Figure 2:
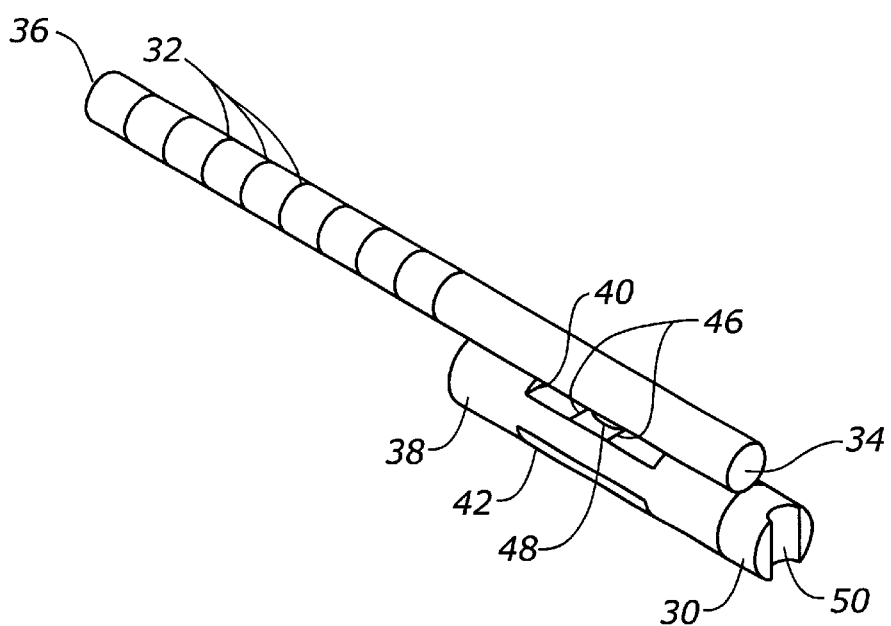
FIG. 2 is a perspective enlarged view of the putting aid.
Figure 3:
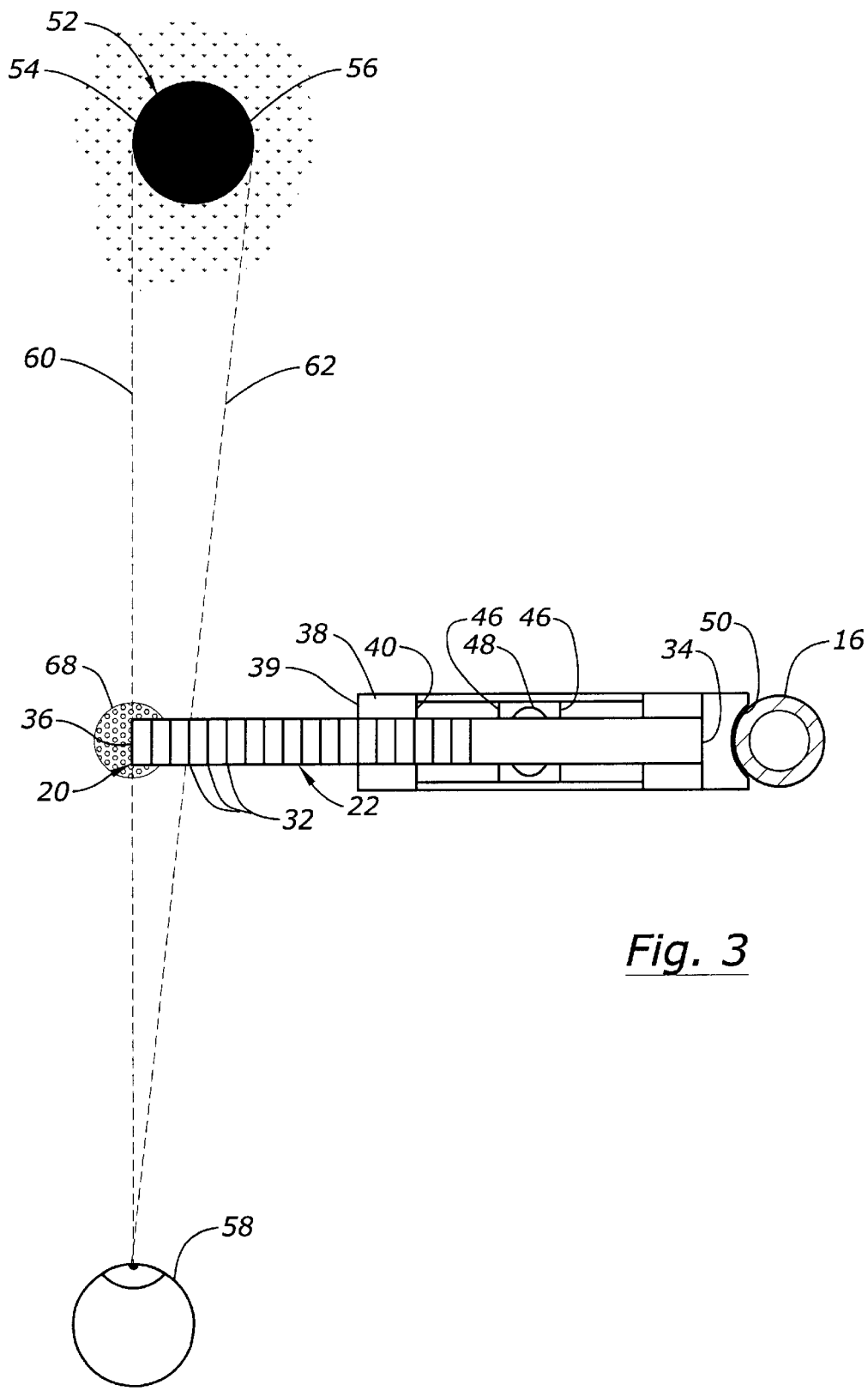
FIG. 3 is a top plan view showing the use of the putting aid to determine the distance of the hole from the ball.

Magnet 30 includes a concave end 50 as can be seen in FIGS. 2 and 3 which enables the magnet to embrace the outer curvature of the putter shaft 16 for detachably affixing the putting aid 20 to the putter shaft 16 as shown in FIG. 1.

Referring to FIG. 3, the device is shown for determining the distance of the hole from the ball. The putting aid 20 is attached to the putter shaft 16 and the putter shaft 16 is held at arms length. The outer end 36 of the elongated member 22 is aligned with the left margin 54 of the putting hole 52 as shown in FIG. 3. The human eye 58 is used to make this alignment along line 60. Then the human eye aligns the right-hand margin 56 of hole 52 with one of the indicia 32 on the elongated member 36. Depending upon which indicia crosses this line 62, the golfer can determine the distance of the hole 52 from the ball. In making this measurement, the shaft 16 is positioned in vertical alignment above a ball 68. Thus the indicia on the elongated member 20 tells the golfer the distance of the hole from the ball. Alternatively the right edge 56 of the hole 52 may be aligned with the left end 39 of the level 38 and the line 60 will then intersect one of the indicia 32 to the left of left end 39 so as to indicate distance.

Figure 4:
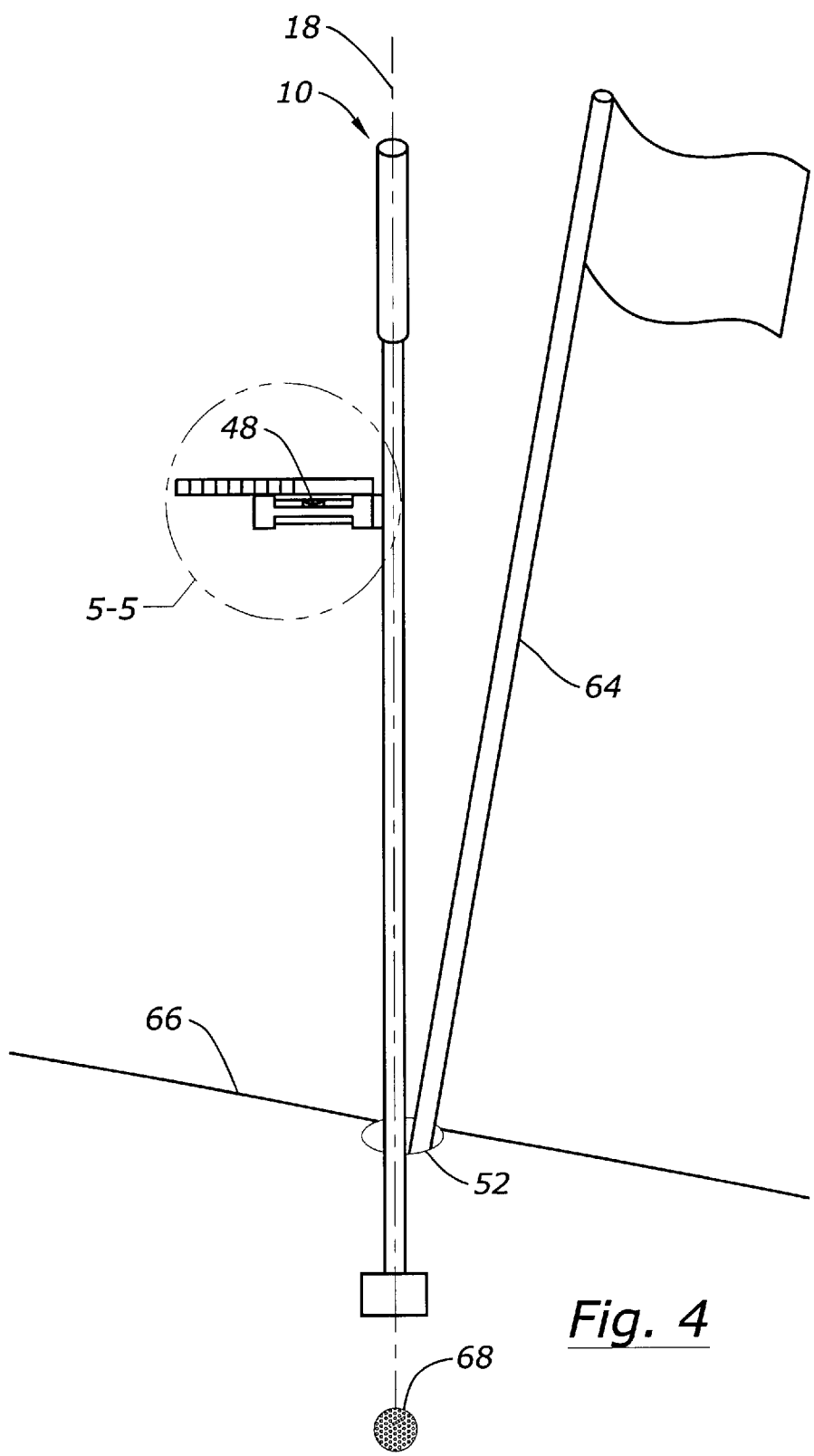
FIG. 4 is an elevational view showing the use of the putting aid to determine whether or not the putt will break left to right or right to left.

FIG. 4 illustrates the use of the putting aid to make the putter 10 into a plumb bob for determining the direction in which the ball will break as it approaches the hole. The level bubble 48 is positioned so that the level is horizontal and this results in the vertical axis 18 of the putter 10 being precisely vertical as in the nature of a plumb bob. The putter is then positioned directly over the ball and in alignment with the center of the hole 52. The horizon 66 adjacent the hole indicates whether the break is to the right or to the left. This can be visually ascertained by comparing the angle of the vertical plumb bob created by the putter 10 and the line of the horizon 66.

Figure 6:
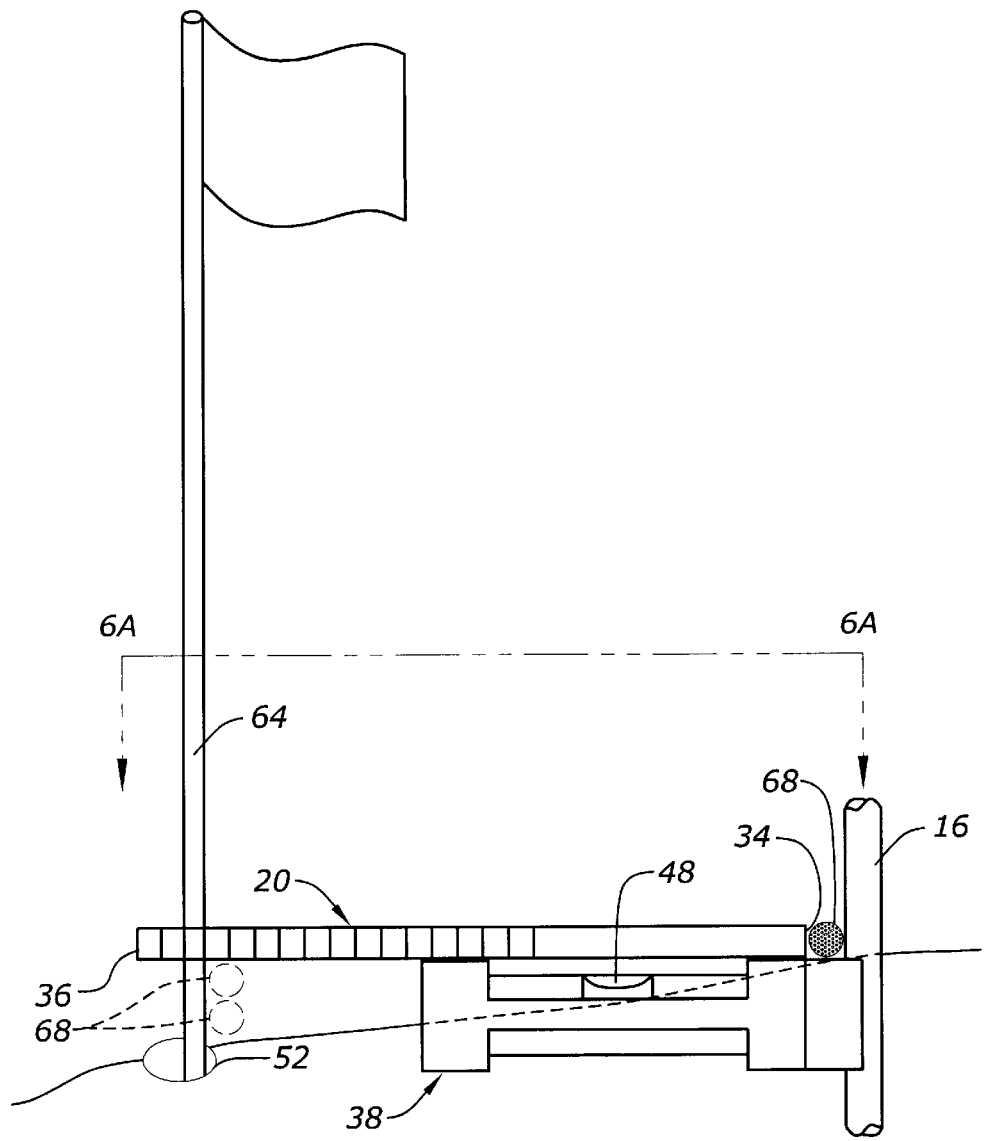
FIG. 6 is an elevational view showing the use of the putting aid in alignment with the ball in order to determine the uphill/downhill nature of the putt.
Figure 6A:
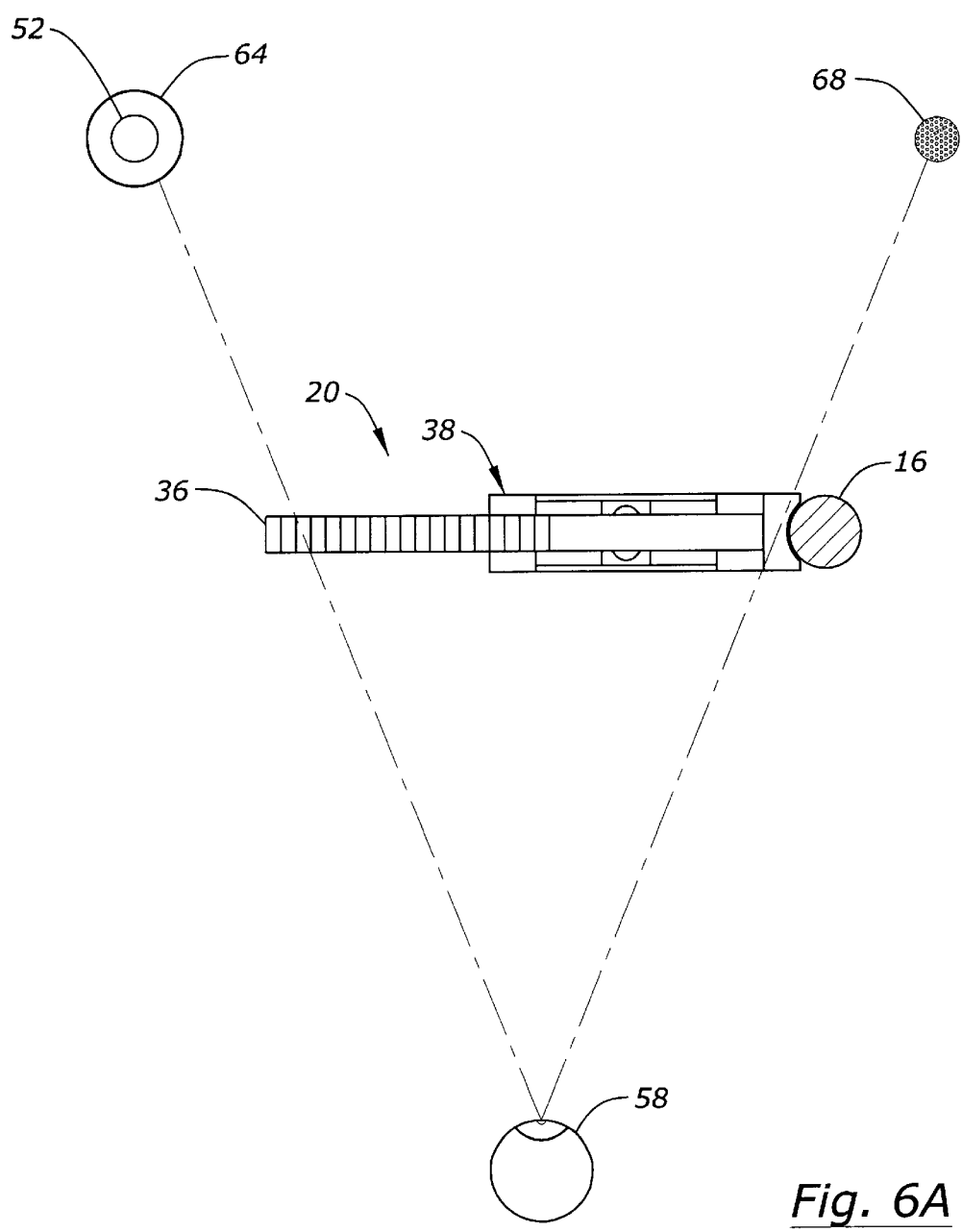
FIG. 6A is a schematic view taken along line 6A—6A of FIG. 6.

The putter can also be used as a plumb bob to determine the uphill or downhill nature of the putt as illustrated in FIG. 6. Again the bubble 48 is positioned centered between the markings on the level and this causes the putter shaft 16 to be vertical. The orientation of the uphill/downhill horizon 70 indicates whether the putt is uphill or downhill. In making this assessment the operator stands at a point between the ball 68 and the hole 52 and to one side of a line between the ball 68 and the hole 52 in order to measure this variable. If the ball 68 is above the hole 52, the putting aid is then held an appropriate distance from the putter's eye 58 so that the inner end 34 of elongated member 22 is aligned with the ball 68 and the outer end 36 of elongated member 22 intersects the flag stick 64. If the hole 52 is above the ball 68, then the outer end 36 is placed on the hole and the inner end 32 is positioned above the ball 68. In either case the slope can be determined by estimating the number of ball thicknesses the elongated member 22 is above the hole or ball respectively.

The horizontal member 22 can also be horizontally aligned with any point on the horizon between the ball 68 and the hole 52 in order to determine the slope at that point. In FIG. 6 the putting aid 20 is shown attached to the putter shaft 16, but it also may be hand held and disattached from the putter shaft 16.

The device is simple and easy to use. It can be carried in a golfer's pocket and can be attached to the shaft of the putter quickly and easily at the time of putting. It enables the golfer to examine the three variables shown in FIGS. 3, 4, and 6 and described above. The putting aid permits the putter shaft to be used as a plumb bob in a much more accurate fashion then is normally achieved.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method aligning a putt of a golf ball on a golf green having a golf hole positioned in spaced relation to the golf ball, the hole having first and second opposite margins located across a hole diameter, the method comprising:

taking a putting aid comprising a level having a longitudinal level axis and a bubble indicator for indicating orientation of the longitudinal level axis with respect to a level orientation; an elongated member affixed to the level and having an elongated scale of calibrations that includes a longitudinal scale axis extending parallel to the level axis; and an attachment member affixed to at least one of the level and the elongated member;

viewing the golf hole and the ball from the side and aligning the elongated member of the putting aid with either the golf ball or the golf hole;

determining the slope of the surface of the green from the ball to the hole by observing the orientation of the golf ball and the hole relative to the position of the bubble indicator of the putting aid;

positioning the putting aid in alignment with the ball and the hole;

determining the slope of the green to right or left of a line from the ball to the hole by observing the surface of the green and the bubble indicator relative to one another;

determining the distance from the ball to the golf hole by holding the putting aid aligned vertically over the golf ball, aligning a first calibration of the scale with the first margin of the golf hole, aligning a second calibration of the scale with the second margin of the golf hole, and observing the distance between the first and second calibrations.

2. A method for using a putting aid in combination with a putter having a putter grip, a putter head, and a putter shaft, the putter shaft having a longitudinal shaft axis, the method comprising:

taking a putting aid comprising a level having a longitudinal level axis and a bubble indicator for indicating orientation of the longitudinal level axis with respect to a level orientation; an elongated member affixed to the level and having an elongated scale extending along a longitudinal member axis parallel to the level axis; and an attachment member affixed to at least one of the level and the elongated member;

detachably affixing the attachment member to the putter shaft so that the attachment member retentively engages the putter shaft and holds the level axis and the scale axis perpendicular to the shaft axis;

adjusting the orientation of the putter shaft until the bubble indicator indicates that the level axis and the scale axis are in a horizontal level orientation, whereby the putter shaft will be in a vertical orientation for use as a plumb bob in lining up the put of a ball positioned on a green in spaced relation to a golf hole.

3. A method according to claim 2 and further comprising holding the putting aid at arms length and lining up the outside margins of the golf hole with spaced apart indicia on the scale of the elongated member to determine the distance of the golf hole from the putter.

4. A method according to claim 3 and further comprising placing the putting aid shaft in vertical alignment above the ball so as to enable a determination from the indicia on the scale of the distance of the ball from the hole.

5. A method according to claim 2 and further comprising lining up the putter shaft with the center of the hole and determining from the orientation of the surface of the green adjacent the hole whether or not the putt is right to left or left to right.

6. A method according to claim 2 and further comprising moving to a position between the ball and the hole and to one side of a line between the ball and the hole, and using the vertical orientation of the putter shaft to determine whether the hole is uphill or downhill from the ball.

7. A method according to claim 2 wherein the attachment member comprises a magnet and the putter shaft is metal, the step of detachably affixing the attachment member to the putter shaft comprising placing the magnet in contact with the putter shaft.

8. A method according to claim 2 wherein the elongated member comprises first and second opposite member ends and the level comprises first and second opposite level ends, the method further comprising affixing the attachment member to one of the first and second member ends or one of the first and second level ends.

\* \* \* \* \*